(12) United States Patent
Duan et al.

(10) Patent No.: US 10,832,000 B2
(45) Date of Patent: Nov. 10, 2020

(54) IDENTIFICATION OF TEXTUAL SIMILARITY WITH REFERENCES

(71) Applicant: International Business Machines Corporation, Armonk, NY (US)

(72) Inventors: Dongxu Duan, Beijing (CN); HongLei Guo, Beijing (CN); Zhili Guo, Beijing (CN); Zhong Su, Beijing (CN); Guoyu Tang, Beijing (CN); Shiwan Zhao, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 31 days.

(21) Appl. No.: 15/350,355

(22) Filed: Nov. 14, 2016

(65) Prior Publication Data

US 2018/0137090 A1    May 17, 2018

(51) Int. Cl.
  *G06F 40/30*    (2020.01)
  *G06F 40/205*    (2020.01)

(52) U.S. Cl.
  CPC ............ *G06F 40/30* (2020.01); *G06F 40/205* (2020.01)

(58) Field of Classification Search
  CPC .......... G06F 17/22; G06F 17/24; G06F 17/27; G06F 17/2785; G06F 17/2705
  See application file for complete search history.

(56) References Cited

U.S. PATENT DOCUMENTS

| | | | | |
|---|---|---|---|---|
| 7,194,469 | B1 * | 3/2007 | Dowd | G06F 17/2229 |
| 7,912,705 | B2 * | 3/2011 | Wasson | G06F 17/241 |
| | | | | 704/9 |
| 8,082,241 | B1 * | 12/2011 | Pop-Lazarov | G06F 16/382 |
| | | | | 707/708 |
| 8,315,849 | B1 * | 11/2012 | Gattani | G06F 17/28 |
| | | | | 704/10 |
| 8,521,517 | B2 * | 8/2013 | O'Neill | G06F 17/3053 |
| | | | | 704/1 |
| 8,793,242 | B2 * | 7/2014 | Gherman | G06F 17/30705 |
| | | | | 707/673 |

(Continued)

FOREIGN PATENT DOCUMENTS

| WO | 2015028468 A1 | 3/2015 | |
|---|---|---|---|
| WO | WO-2017146728 A1 * | 8/2017 | .......... G06F 17/2211 |

OTHER PUBLICATIONS

Yoon Kim, Oct. 25, 2014, 2014 Association for Computational Linguistics (Convolution.pdf), pp. 1-6 (Year: 2014).*

(Continued)

*Primary Examiner* — Asher D Kells

(74) *Attorney, Agent, or Firm* — Amin, Turocy & Watson, LLP

(57) ABSTRACT

Techniques for determining a similarity between text segments within a document comprising textual references are described. According to an example, a system comprises a memory that stores computer executable components; and a processor that executes the computer executable components stored in the memory. The computer executable components can comprise: an identification component that identifies a reference associated with a set of text and an extraction component that extracts the reference from the set of text. The computer executable components can also comprise an embedding component that replaces the reference with a corresponding vector.

11 Claims, 7 Drawing Sheets

(56) References Cited

U.S. PATENT DOCUMENTS

| | | | | |
|---|---|---|---|---|
| 8,898,190 | B2* | 11/2014 | Krause | G06F 17/30716 |
| | | | | 707/776 |
| 8,972,412 | B1* | 3/2015 | Christian | G06F 17/30728 |
| | | | | 707/748 |
| 9,075,498 | B1 | 7/2015 | Wiggins et al. | |
| 9,092,479 | B1* | 7/2015 | Baker | G06F 17/30389 |
| 9,177,050 | B2 | 11/2015 | Lu et al. | |
| 9,697,204 | B2* | 7/2017 | Brelsford | G06F 17/30014 |
| 9,762,521 | B2* | 9/2017 | Chakra | H04L 51/18 |
| 2004/0068527 | A1* | 4/2004 | Smith, III | G06F 17/30855 |
| 2005/0005239 | A1* | 1/2005 | Richards | G06F 40/134 |
| | | | | 715/210 |
| 2005/0235036 | A1* | 10/2005 | Nielsen | G06Q 10/107 |
| | | | | 709/206 |
| 2007/0033264 | A1* | 2/2007 | Edge | H04L 29/12066 |
| | | | | 709/217 |
| 2007/0136318 | A1* | 6/2007 | Clark | G06F 17/30864 |
| 2008/0071774 | A1* | 3/2008 | Gross | G06F 17/30864 |
| 2008/0109712 | A1* | 5/2008 | McBrearty | G06F 17/24 |
| | | | | 715/208 |
| 2008/0172738 | A1* | 7/2008 | Bates | G06F 17/30887 |
| | | | | 726/22 |
| 2009/0018988 | A1* | 1/2009 | Abrams | G06F 17/30731 |
| 2010/0005087 | A1* | 1/2010 | Basco | G06F 17/30864 |
| | | | | 707/E17.017 |
| 2010/0036828 | A1* | 2/2010 | Carmel | G06F 17/30722 |
| | | | | 707/708 |
| 2010/0125601 | A1 | 5/2010 | Jackson et al. | |
| 2010/0257161 | A1 | 10/2010 | Kemp et al. | |
| 2011/0113317 | A1* | 5/2011 | Ramaswamy | G06F 17/30876 |
| | | | | 715/205 |
| 2011/0213655 | A1* | 9/2011 | Henkin | G06Q 30/00 |
| | | | | 705/14.49 |
| 2012/0072422 | A1* | 3/2012 | Rollins | G06F 40/258 |
| | | | | 707/737 |
| 2012/0239761 | A1* | 9/2012 | Linner | G06F 17/2765 |
| | | | | 709/206 |
| 2012/0265762 | A1* | 10/2012 | Wade | G06Q 50/184 |
| | | | | 707/741 |
| 2012/0323880 | A9 | 12/2012 | Al-Kofahi et al. | |
| 2013/0262596 | A1* | 10/2013 | Srikrishna | G06F 17/30755 |
| | | | | 709/206 |
| 2014/0244734 | A1* | 8/2014 | Nutt | H04L 51/046 |
| | | | | 709/203 |
| 2015/0200963 | A1* | 7/2015 | Geng | G06F 21/51 |
| | | | | 726/22 |
| 2016/0042061 | A1 | 2/2016 | Sengupta et al. | |
| 2016/0055348 | A1* | 2/2016 | Lewak | G06F 21/6227 |
| | | | | 713/193 |
| 2016/0098405 | A1* | 4/2016 | Gorbansky | G06F 16/24578 |
| | | | | 707/749 |
| 2016/0140951 | A1* | 5/2016 | Agiomyrgiannakis | |
| | | | | G10L 13/02 |
| | | | | 704/260 |
| 2016/0225059 | A1* | 8/2016 | Chow | G06Q 30/0625 |
| 2016/0328383 | A1* | 11/2016 | Cross, III | G06F 40/211 |
| 2016/0328388 | A1* | 11/2016 | Cao | G06F 40/169 |
| 2017/0180398 | A1* | 6/2017 | Gonzales, Jr. | H04L 63/1416 |
| 2017/0295202 | A1* | 10/2017 | Aharon | H04L 63/1416 |
| 2017/0344530 | A1* | 11/2017 | Krasadakis | G06F 17/241 |
| 2018/0047072 | A1* | 2/2018 | Chow | G06Q 30/0282 |

OTHER PUBLICATIONS

Xinchi Chen, Jul. 23, 2016, Shanghai Key Laboratory of Intelligent Information Processing (Neural.pdf), pp. 1-10 (Year: 2016).*

Narayana, et al., "Text Clustering Using Reference Centered Similarity Measure," Last Accessed: Oct. 10, 2016, 9 pages.

Bianchi, et al., "ICT Tools for the Discovery of Semantic Relations in Legal Documents," Last Accessed: Oct. 10, 2016, 8 pages.

Winkels, et al., "Constructing a Semantic Network for Legal Content," Last Accessed: Oct. 10, 2016, 8 pages.

* cited by examiner

IDENTIFICATION OF TEXTUAL SIMILARITY WITH REFERENCES

BACKGROUND

The subject disclosure relates generally to determining a similarity between texts and in particular to determining a similarity between texts that include reference text.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system can comprise a memory that stores computer executable components and a processor that executes the computer executable components stored in the memory. In an aspect, a computer executable component can comprise an identification component that identifies a reference associated with a set of text. In another aspect, the system can also comprise an extraction component that extracts the reference from the set of text. Furthermore, the system can comprise an embedding component that replaces the reference with a corresponding vector.

According to yet another embodiment, a computer program product is provided for efficiently determining textual similarities, the computer program product can comprise a computer readable storage medium having program instructions embodied therewith. In an aspect, the program instructions are executable by a processor and cause the processor to identify a reference associated with a set of text. Thereafter, the computer program product can cause the processor to extract the reference from the set of text. Additionally, the computer program product can cause the processor to embed a vector corresponding to the reference as a replacement for the reference.

DETAILED DESCRIPTION

Figure 1:
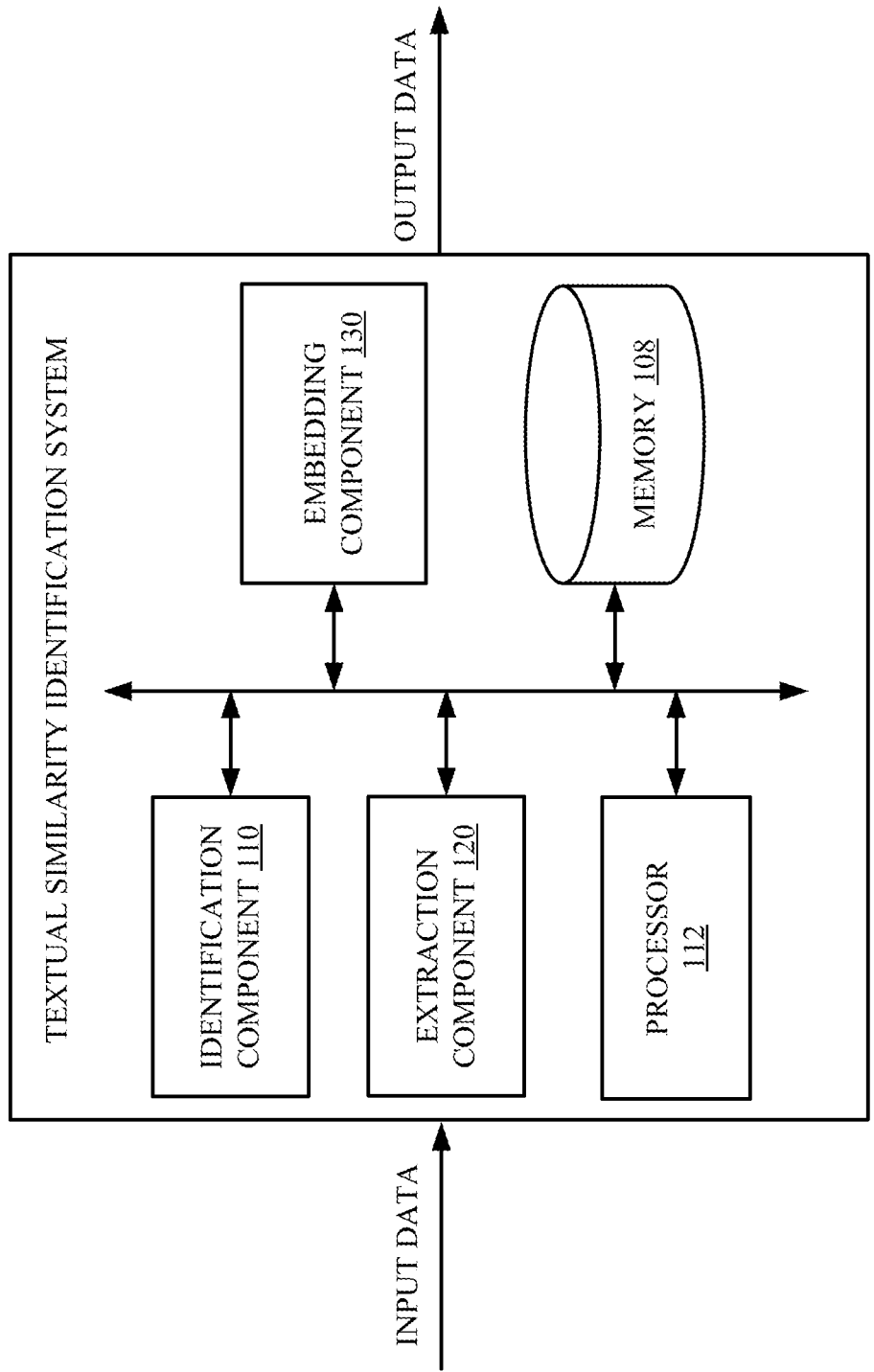
FIG. 1 illustrates a block diagram of an example, non-limiting system that can facilitate a determination of similarity between text segments and/or word segments of a document comprising reference text in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Aspects of the present invention are directed to systems, devices, apparatuses, computer program products and/or computer-implemented methods that facilitate determining a similarity between segments of text within a document that contains identifiers referencing text segments within the text and/or reference text. A reference text identifier can be textual content within a text that cites another text or another referenced location to find the text cited by the reference identifier. For instance, legal materials often refer to sections, codes, regulations, or other such identifiers that present the textual language cited by the respective section identifier, code identifier, regulation identifier or other such identifier. While these reference identifiers help keep textual documents concise, they also inhibit various document analysis operations from being achieved. For instance, the activity of accurately determining the similarity between two segments of text within a document can prove useful in performing text reformulation tasks, text customization activities, search activities, matching activities, and other such forms of document analysis.

Moreover, the presence of reference identifiers and/or reference text within one or more documents can present significant hurdles to a determination of similarity between words or text segments within the one or more documents. For example, the presence of reference identifiers can inhibit the ability to perform tasks such as measuring the similarity between the text of the reference in the document and other text segments of the document. As such, the present invention provides systems, apparatuses, computer program products and/or computer-implemented methods that facilitate a determination of the similarity between segments and/or words within a document that contains reference identifiers and/or reference text. For example, some system embodiments use a processor to execute one or more computer-components that identify reference text, extract reference text, and embed reference text with a vector format to facilitate a determination of similarity between text segments and/or words within one or more documents. Furthermore, some embodiments can facilitate an analysis of legal text while considering the desire for a seamless natural language relationship between textual content and reference text to facilitate comprehension of the textual content by a reading audience.

One or more embodiments will now be described with reference to the figures, wherein like referenced numerals are used to refer to like elements throughout. In the following description, for purposes of explanation, numerous specific details are set forth merely to provide a more thorough understanding of the one or more embodiments. It is evident, however, in various cases, that the one or more embodiments can be practiced without such specific details.

FIG. 1 illustrates a block diagram of an example, non-limiting system 100 that can facilitate a determination of similarity between text segments and/or word segments of a document comprising reference text in accordance with one or more embodiments described herein. In some embodiments, system 100 can (by way of example and without limitation) be associated with or included in a data analytics system, a data processing system, a graph analytics system, a graph processing system, a big data system, a social network system, a speech recognition system, an image recognition system, a bioinformatics system, a data compression system, an artificial intelligence system, an authentication system, a syntactic pattern recognition system, a medical system, a health monitoring system, a network system, a computer network system, a communication system, a router system, a server system or the like.

Aspects of systems, apparatuses, or processes in accordance with the present invention (e.g., system 100 and the like), can be implemented as one or more machine-executable component(s) e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein.

With reference now to FIG. 1, system 100 includes an identification component 110, an extraction component 120, and an embedding component 130. The system can also include or otherwise be associated with at least one processor 112 that is operably coupled to and can read/execute computer instructions stored in memory 108 in accordance with the present invention.

In an aspect, the identification component 110 can identify a reference associated with a set of text, which can be any document containing textual content, textual reference identifiers, and or reference text content. Thus, for instance the document can be a legal document that references insurance coverage regulations and laws (e.g., section number, statute number, policy numbers, legal codes, etc.). The body of the text can reference various sections in which insurance coverage legal details can be provided, such as "Section 19.1(a)", "Section 19.1(b)", and "Section 19.1(d)" which respectively detail employer liability provisions, commercial general liability provisions, and automotive liability insurance.

As is known, textual content and/or reference textual content in a legal text can use similar terms and language to describe obligations, rights, and limitations with similar meanings. For instance, the terms "insurance coverage" and "umbrella insurance" both include a common term i.e., "insurance." Although the applicability, extent and manner of insurance coverage may be different, there is a commonality of terms. Furthermore, an insurance policy may refer to both terms, i.e., the policy may include a description of one or more attributes of insurance coverage associated with the policy and also may include a subsection (or rider) describing the attributes of umbrella insurance coverage.

Based on such similarities, the reference text may be narrowed down to specific sentences within the text. Also, if the document includes reference text embedded within the document' content and in a format (e.g., vector format) that is consistent with the rest of the document, then similarities between the text and reference text can be determined.

With reference again to FIG. 1, in order to achieve such embedding of reference text and determination of textual similarities, the identification component 110 employed by system 100 can embody computer instructions executable by processor 112 to identify textual references within the set of textual material. In an aspect, identification component 110 can identify the format (e.g., pdf, word, etc.) of a textual document. Furthermore, as will be described in more detail below, some embodiments of identification component 110 can identify whether a textual reference is a hyperlink embedded within the document, that references another location within the document, or a different document. As is known, such a hyperlink reference can indicate the location of reference text content that may elaborate on or provide context to the textual content.

In an aspect, upon the identification of a textual reference, identification component 110 can identify the context of such reference within the document. For instance, the reference can follow a particular organizational structure such as providing a reference to a section number and a subparagraph number. As such, each reference (or, in some embodiments, one or more references) can be identified from a contextual perspective in order to determine its relationship to the entire document. For instance, a segment of reference text can be contextualized as a subsection of an insurance provision in an insurance policy document. Furthermore, identification of the context of the reference text within the textual document, the identification component 110 can facilitate the ability of extraction component 120 to correlate the the textual reference to or further extract a reference template, stored in memory 108, that contains pertinent reference text organized into an extractable framework. In an aspect, a reference template is a document comprising reference text associated with the text arranged in an organized and extractable manner.

Accordingly, system 100 can employ an extraction component 120 that can extract the first subset of textual material from the set of textual material. In an aspect, the extraction component 120 can extract the reference identified by identification component 110 from the set of text. In another aspect, the extraction component 120 can extract the reference from a template that comprises the references. In some embodiments, the extraction component 120 can utilize various data to perform the extraction activities, and such information can include, but is not limited to, contextual information and hyperlink identification information. For instance, extraction component 120 can identify a first word in the text and infer other words that correlate with the first word to determine particular reference text for extraction. Accordingly, extraction component 12 can utilize hyperlink identification information such as the coordinates or location of such contextual words within the document in order to pinpoint and extract such reference text. Furthermore, in an aspect, the extraction component 120 can extract reference text from an extractable template and customize the reference text language to the language of textual content in the document.

In yet another aspect, system 100 can use the embedding component 130 to embed a first version (e.g., a customized version) of the first subset of textual material at a first location corresponding to the first textual reference within the set of textual material, wherein the first version of the textual material comprises at least part of the first subset of textual material. In an aspect, a textual reference such as a section number or other reference identifier can identify reference text within the same textual document of the textual reference or within a different textual document of the textual reference. The extraction component 120 can extract the textual reference in its original form or extract an augmented version of the textual reference based on various language criteria.

Furthermore, the extraction component 120 in connection with the embedding component 130 can embed the reference text and a corresponding vector in either an augmented or original form at one or more particular location within the textual content such that the reference is seamlessly integrated into the document. In an aspect, a vector that corresponds to the reference text refers to a set of numbers that are mapped to words of reference text. Thus, the presence of textual content associated with the references embedded within the textual content can facilitate an efficacious determination of similarity between text segments of the legal document. In an aspect, the embedding component 130 can utilize known semantic parsing and ontological matching techniques to facilitate the embedding of text within a textual document.

By embedding reference text within the body of the textual document rather than via reference identifiers, embedding component 130 can facilitate the standardization of the textual document (e.g., legal document). The embedding process can include the introduction of reference text containing reference vectors within the original textual content of the document to facilitate the performance of a known similarity measure between text segments within the document. Furthermore, the known similarity measure can represent a metric that conveys a similarity between two documents as well using any of several similarity measures. In an aspect, the embedded reference vectors (e.g., embedded using embedding component 130) can represent embedded words or text segments in a continuous vector space. In accordance with a known technique, the vectors can be mapped to similar words based on language characteristics such as contextual descriptions and semantic meanings.

The embedding component 130 can embed vectorized defined terms based on a relationship between a key term and the reference text. By embedding component 130 embedding reference text comprising a vector format into the text document, system 100 can facilitate a determination of similarity of text terms and text segments using a variety of determination techniques such as cosine similarity operations and machine learning operations. Furthermore, system 100 can utilize statistics such as how often some words co-occur with neighbor words in a large textual document and then map these statistics to a particular vector for each word. The system 100 can employ components that utilize vector characteristics (e.g., small, large, dense, sparse, etc.) to perform these activities.

Figure 2:
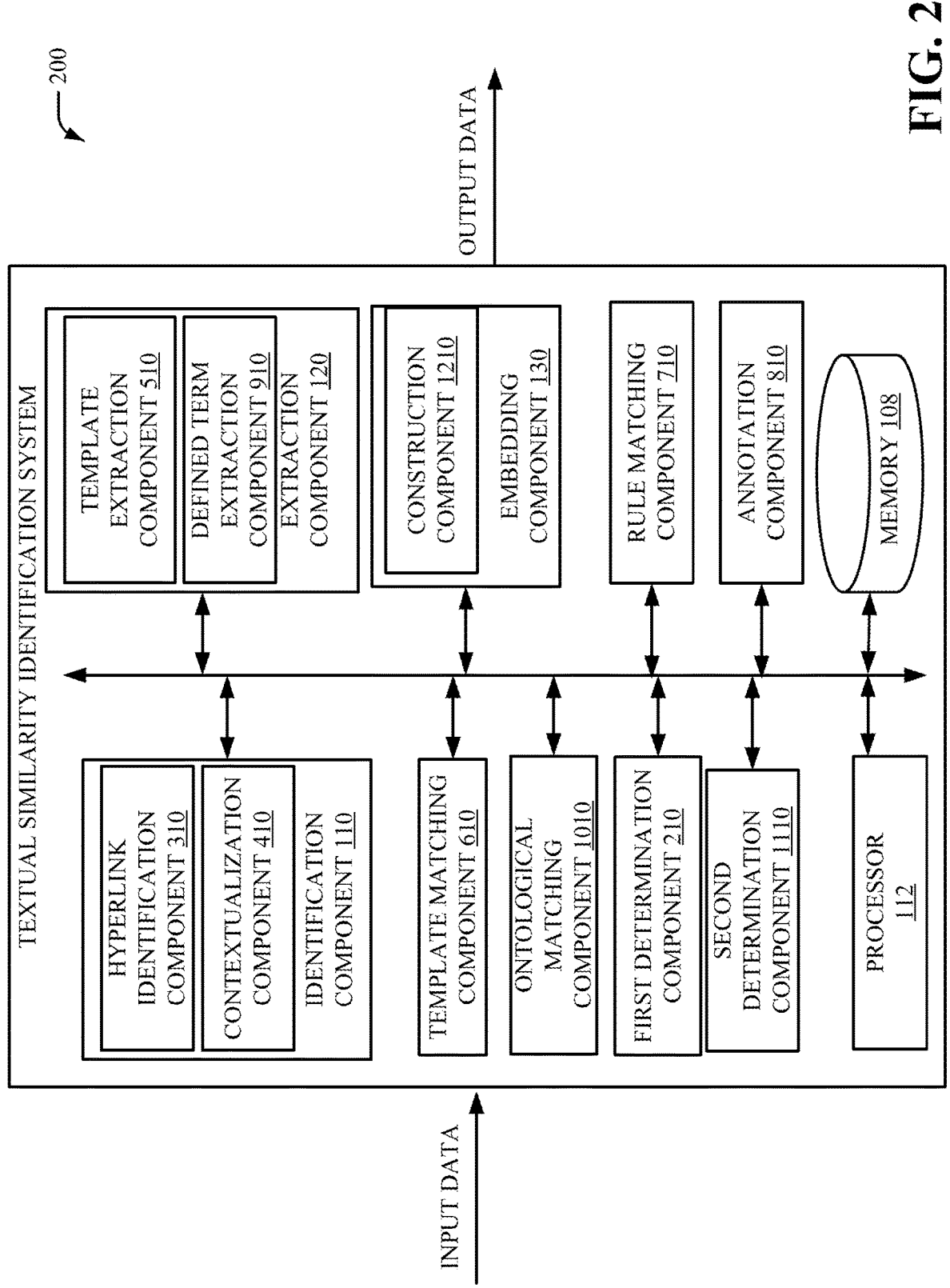
FIG. 2 illustrates a block diagram of an example, non-limiting system that can facilitate embedding a defined term with a reference vector into the text of a document in accordance with one or more embodiments described herein.

FIG. 2 illustrates a block diagram of an example, non-limiting system 200 that can facilitate embedding a defined term with a reference vector into the text of a document in accordance with one or more embodiments described herein. Repetitive description of like elements employed in other embodiments described herein are omitted for sake of brevity.

In a non-limiting embodiment, system 200 can comprise identification component 110, extraction component 120, embedding component 130, and a first determination component 210 that can determine a similarity between first language of an embedded reference and second language of another embedded reference, wherein the similarity is determined based on a group of operations consisting of a cosine similarity operation and a machine learning algorithm, and wherein the embedded reference and the another embedded reference comprises the corresponding vector and another corresponding vector respectively capable of being analyzed by the group of operations.

In an aspect, the embedding (e.g., using embedding component 130) of a vectorized reference text within the textual content of a document (as a replacement for a reference identifier) at a location where the reference identifier previously resided, to perform a similarity analysis of the textual content embedded with reference text vectors. For example, in an aspect, system 200 can employ first determination component 210 to determine the similarity between two text segments within the document containing embedded textual reference vectors. The first determination component 210 can employ a cosine similarity operation to perform a similarity determination between segments of text. For instance, each term within a text segment can be associated with a respective vector dimension while such textual segment comprised of a series of dimensions can also be represented by a vector. Further, a first vector corresponding to the textual segment can be compared to a second vector of another textual segment based on a cosine of the angle formed by the two vectors.

As an example, two vectors that comparatively have a smaller angle than a different two vectors may be determined by first determination component 210 to have a greater similarity (greater similarity than the two vectors that have a larger angle). In some embodiments, the first determination component 210 can determine the cosine of the angle between each respective pair of vectors (or, in some embodiments, one or more pairs of vectors) to perform a comparative similarity determination using a standardized value. As such, the first determination component 210 can make use of text data transformed into a vector format to facilitate similarity determinations.

In another aspect, first determination component 210 can employ a machine learning operation in the determination of a similarity between two text segments. For instance, first determination component 210 can use a machine learning operation to aggregate feature values associated with respective features of each term (or, in some embodiments, one or more terms) in a text segment represented by a vector in order to determine a similarity measure between the text segment and another text segment, the machine learning operation can associate one or more feature values to one or more terms to determine whether the one or more terms are an object, action, actor, or part of a common concept.

The first determination component 210 can use the machine learning operation to aggregate such feature values associated with respective terms and determine a similarity score for such aggregate values. Furthermore, the machine learning operation can be customized to analyze longer text segments or short text segments. Also, in some embodiments, the first determination component 210 can employ a range of machine learning operations that can allow for the processing of textual segments in foreign languages, that utilize natural language, informal words and/or informal phrases, and identifies definitions associated with respective terms. Thus, first determination component 210 can utilize a range of operations such as a cosine operation or a machine learning operation to determine a similarity between text segments within a textual document comprising embedded reference text transformed into a vector format.

In a non-limiting embodiment, system 200 can comprise identification component 110, extraction component 120, embedding component 130, first determination component 210, and hyperlink identification component 310 that can identify whether the first subset of textual material is linked to the first textual reference. In an aspect, identification component 110 can employ hyperlink identification component 310 that can identify a hyperlink associated with a reference identifier (e.g., section number of legal code) that references data corresponding to reference text related to the reference identifier. The hyperlink can point to an entire document, a specific element of a document, or a segment of text within a document.

Thus, hyperlink identification component 310 in connection with identification component 110 can identify a hyperlink and respective reference text within a textual document or a different textual document to facilitate the embedding, by embedding component 130, of the reference text within the textual document comprising the reference identifier. The reference text can be extracted, by extraction component 120, and can be embedded in a vector format within the textual document to facilitate a determination of similarity comparisons between segments of text within the textual document.

In another non-limiting embodiment, system 200 can comprise identification component 110, extraction component 120, embedding component 130, first determination component 210, hyperlink identification component 310, and contextualization component 410 that can identify an organizational framework of the first textual reference within the set of textual material. In an aspect, contextualization component 410 in connection with identification component 110 can identify an organizational framework associated with the reference text corresponding to a reference identifier within a textual document. For instance, system 400 can employ processor 112 to execute hyperlink identification component 310 to identify hyperlinks associated with reference identifiers in a textual document. In an aspect, contextualization component 410 can identify a structural or organizational framework associated with the reference text at a document location indicated by the hyperlink. Thus, the reference identifier can be a section number of a legal statute within a textual document.

At the location of the legal statute within a document, the contextualization component 410 can identify the structure of the reference text within the statute such as whether a segment of the reference text is associated with a chapter of a legal code, a section or subsection of a legal code, a subparagraph of a legal code, or any other such structural context of segments of the reference text. Furthermore, the contextualization component 410 in connection with the extraction component 120 can extract the organizational framework identified by contextualization component 410 to facilitate generation of a template containing the reference text.

In yet another non-limiting embodiment, system 200 can comprise identification component 110, extraction component 120, embedding component 130, first determination component 210, hyperlink identification component 310, contextualization component 410, and a template extraction component 510 that can extract a reference template from the organizational framework identified by contextualization component 410. As such, the template extraction component 510 can facilitate the generation of a template by extracting a reference template from the organizational framework, wherein the reference template facilitates faster access to a set of data corresponding to the reference from the memory as compared to access to the set of data from the set of text.

The template can provide an organizational skeleton capable of matching reference text to respective sections of the organized template. For instance, a non-limiting example template can comprise a structure that lists a section number on a top line, a subsection number below the top line, and a subparagraph number indented below the subsection number and identified with a reference numeral between a set of parenthesis. The template can include an organizational framework related to all textual references associated with textual identifiers in a textual document. Furthermore, the extraction (e.g., using template extraction component 510) of the template from the reference text can facilitate a seamless embedding, by embedding component 130, of the reference text within the textual document.

In a non-limiting embodiment, system 200 can comprise identification component 110, extraction component 120, embedding component 130, a first determination component 210, a hyperlink identification component 310, a contextualization component 410, a template extraction component 510, and a template matching component 610 that can match the first textual reference to a second location within the reference template. The template matching component 610 can match the textual references at a location within the textual document or a different document as indicated by a hyperlink (e.g., using hyperlink identification component 310) to the organizational structure of the template.

For instance, the template matching component 610 can match a reference to a location within the reference template. The textual reference can comprise paragraphs of text and template matching component 610 can match portions of each paragraph to respective compartmentalized locations within the organizational framework of the template. This matching operation can provide a formatting for the reference text that facilitates the extraction of reference text segments by extraction component 120. Furthermore, the formatted reference text within the template catalogue can also be altered and seamlessly integrated (e.g., using embedding component 130) in a vector format into the textual document. Thus, similarity determinations between the text document with integrated reference text can be performed by first determination component 210.

In another non-limiting embodiment, system 200 can comprise identification component 110, extraction component 120, embedding component 130, a first determination component 210, a hyperlink identification component 310, a contextualization component 410, a template extraction component 510, a template matching component 610, and a rule matching component 710 that can organize one or more clauses within the set of textual material according to one or more clause rules.

In an aspect, rule matching component 710 can utilize a set of clause rules to categorize and organize information in the template according to an applicable clause rule. For instance, a first clause rule may define criteria that identifies a section of a regulation and a second clause rule may define criteria to define a subsection of a regulation referenced in a textual document. In an aspect, the rule matching component 710 can apply the rule to reference text within the template in order to match respective portions of the text within the template to respective criteria of each clause rule.

Furthermore, each segment of reference text within the template can satisfy more than one clause rule criteria in some instances. Thus a first clause rule can designate criteria to indicate an entire section of a regulation, a second clause rule can designate criteria to indicate a subsection of the regulation, a third clause rule can designate criteria to indicate a sub-paragraph of the subsection. Thus, the rule matching component 710 can utilize a diverse set of clause rules to match reference text to a set of clauses which further facilitates the organization, extraction, and embedding of the reference text.

In another non-limiting embodiment, system 200 can comprise identification component 110, extraction component 120, embedding component 130, a first determination component 210, a hyperlink identification component 310, a contextualization component 410, a template extraction component 510, a template matching component 610, a rule matching component 710, and an annotation component 810 that annotates an organized version of one or more clauses of the set of textual material based on one or more structural rule, wherein a first structural rule represents grammatical requirements for the organized set of clauses.

In accordance with the rule matching component 710 ability to match respective portions of the organized text in the template to respective criteria of each clause rule, the annotation component 810 can annotate respective segments of reference text within the template based on a set of structural rules. As such, an annotation component 810 can provide annotations, comments or explanations of various portions of the reference text within the template. For instance, annotation component 810 can provide a notation that describes an entire section of reference text within the template. Furthermore, annotation component 810 can provide a notation describing a heading of reference text, a subsection of reference text, a subparagraph of reference text, or any other organizational or classification identifier of the reference text.

In another non-limiting embodiment, system 200 can comprise identification component 110, extraction component 120, embedding component 130, first determination component 210, hyperlink identification component 310, contextualization component 410, template extraction component 510, template matching component 610, rule matching component 710, annotation component 810, and defined term extraction component 910 that can extract a defined term from the set of textual material, wherein an extraction of the defined term can be based on performance of a semantic parsing operation on the set of textual material.

In an aspect, the defined term extraction component 910 can extract a particular key term from the set of textual material based on a semantic parsing operation. A semantic parsing operation facilitates the mapping of a formal-language sentence into a natural language representation of the meaning of the sentence. In an aspect, the semantic parsing operation identifies roles for each term (or, in some embodiments, one or more terms) in a sentence of text. Thus, using the semantic parsing operation, the defined term extraction component 910 can determine whether a term is a singular common noun, singular proper noun, plural common noun, plural proper noun, other type of noun, possessive pronoun, adjective, determiner term, possessive ending term, cardinal number term, adverb, coordinating conjunction term, preposition, subordinating conjunction, bare form verb, present tense verb, past tense verb, past participle verb, modal verb.

Furthermore, defined term extraction component 910 can also utilize the semantic parsing operation to determine the relationship of a term to other terms in a sentence. For instance, a term may modify a first term, or conjugate a second term and third term, and depend from a fourth term. Accordingly, the defined term extraction component 910 can utilize all the semantic information resulting from the semantic parsing operation to identify a key term and extract such key term from the textual material of the document. The extraction of such key terms can facilitate a calculation of a similarity score between the key term and reference text to enable embedding of the reference text at the location of the keyword.

In yet another non-limiting embodiment, system 200 can comprise identification component 110, extraction component 120, embedding component 130, first determination component 210, hyperlink identification component 310, contextualization component 410, template extraction component 510, template matching component 610, rule matching component 710, annotation component 810, defined term extraction component 910, and ontological matching component 1010 that can match the defined term to a reference term within the first subset of textual material, wherein a matching of the defined term to a reference term can be based on an ontological matching operation.

In an aspect, the ontological matching component 1010 can match the defined term extracted by the defined term extraction component 910 to a reference term that can be associated with a predefined ontology classifier. As such, each reference term in a sentence of reference text can have an associated ontology, which is a formal classification and definition of the types of properties and interrelationships between reference terms in a sentence. In an aspect, each reference term within a sentence in the reference text can be matched to a predefined ontological classifier. Thus, ontological matching component 1010 can match the defined term to an reference term associated with a respective ontology within each sentence of the reference text. Furthermore, a similarity between the ontological term and the defined term can be calculated using second determination component 1110. For instance, the similarity between the defined term and the reference term can be determined based on an ontological relationship between the reference term and other terms within a reference sentence. Also, the defined term can take on a different meaning in various reference text segments; thus the ontological matching component 1010 can match the extracted defined term to the segment of reference text that provides a matching context and meaning of the defined term.

Furthermore, ontological matching component 1010 can match a range of subtly or widely variable defined terms to multiple reference text segments to facilitate the generation of standardized language within the textual document. For instance, the terms insurance coverage, insurance amount, and insurance premium can all be matched to reference text that relates to insurance subject matter. Furthermore, each term (or, in some embodiments, one or more terms) may be associated with similar or same relevant descriptive reference text. Thus, such terms should be matched together and reference the same descriptive reference text based on ontological matching criteria (e.g., language classifications, grammatical commonalities, semantic similarities, syntactic similarities, data schematic similarities, etc.). As such, the matching of extracted defined terms to reference text by ontological matching component 1010 can facilitate a seamless embedding (e.g., using embedding component 130) of reference text segments into the textual document.

In a non-limiting embodiment, system 200 can comprise identification component 110, extraction component 120, embedding component 130, first determination component 210, hyperlink identification component 310, contextualization component 410, template extraction component 510, template matching component 610, rule matching component 710, annotation component 810, defined term extraction component 910, ontological matching component 1010, and second determination component 1110 that can determine a similarity score based on a comparison of the defined term and the reference term, wherein the similarity score can represent a degree of similarity between the defined term and the reference term.

In an aspect, the second determination component 1110 can determine a similarity score based on a comparison between the defined term and the reference term. The similarity can be based on any number of criteria including semantic lexicon matching, natural language fit within a sentence, grammatical fit within a sentence, distributional similarities learned from large text collections, or vector-based measures such as cosine similarity operations and machine learning operations.

The similarity score determined by second determination component 1110 can be utilized by extraction component 120 and embedding component 130 to determine the best fit reference text for extraction and embedding within the set of textual material. For instance, the embedding component 130 can embed a version of the reference textual material based on the similarity score being greater than a threshold score. The threshold score can correspond to a minimum level of similarity between segments of reference text and textual content. As such, the similarity score between the reference text and the defined term provides a metric for the performance of other operations employed by respective components of system 1100.

In a non-limiting embodiment, system 200 can comprise identification component 110, extraction component 120, embedding component 130, first determination component 210, hyperlink identification component 310, contextualization component 410, template extraction component 510, template matching component 610, rule matching component 710, annotation component 810, defined term extraction component 910, ontological matching component 1010, second determination component 1110, construction component 1210 that can embed the defined term with a reference vector based on a neural sentence embedding model, wherein the neural sentence embedding model can facilitate access to a colloquial recitation of the first version of the first subset of textual material within the set of textual material, and wherein the reference vector can represent the defined term embedded within the first version of the first subset of textual material.

By embedding the defined term with a reference vector into the set of textual material, the construction component 1210 can allow for a similarity score to be determined between various text segments within a document. The vectorized reference text and keyword allow for the performance of cosine operations and machine learning operations to act upon the entirety of the text within the document. Furthermore, a neural sentence embedding model can facilitate a determination of similarity between text segments with a greater degree of accuracy by ensuring that the embedded defined term meets natural language criteria for seamless integration into the textual content of the document. As such, the construction component 1210 can allow for the replacement of a keyword with a reference vector and for the key word to be altered to accurately fit a description of reference text. A newly embedded vectorized work or segment of text can then be embedded by embedding component 130. Furthermore, a combination of reference vectors can be pooled and matched to the altered key word and embedded within a vectorized term or vectorized segment of text. Accordingly, the vectorized term or vectorized segment of text can be embedded within the document.

Figure 3:
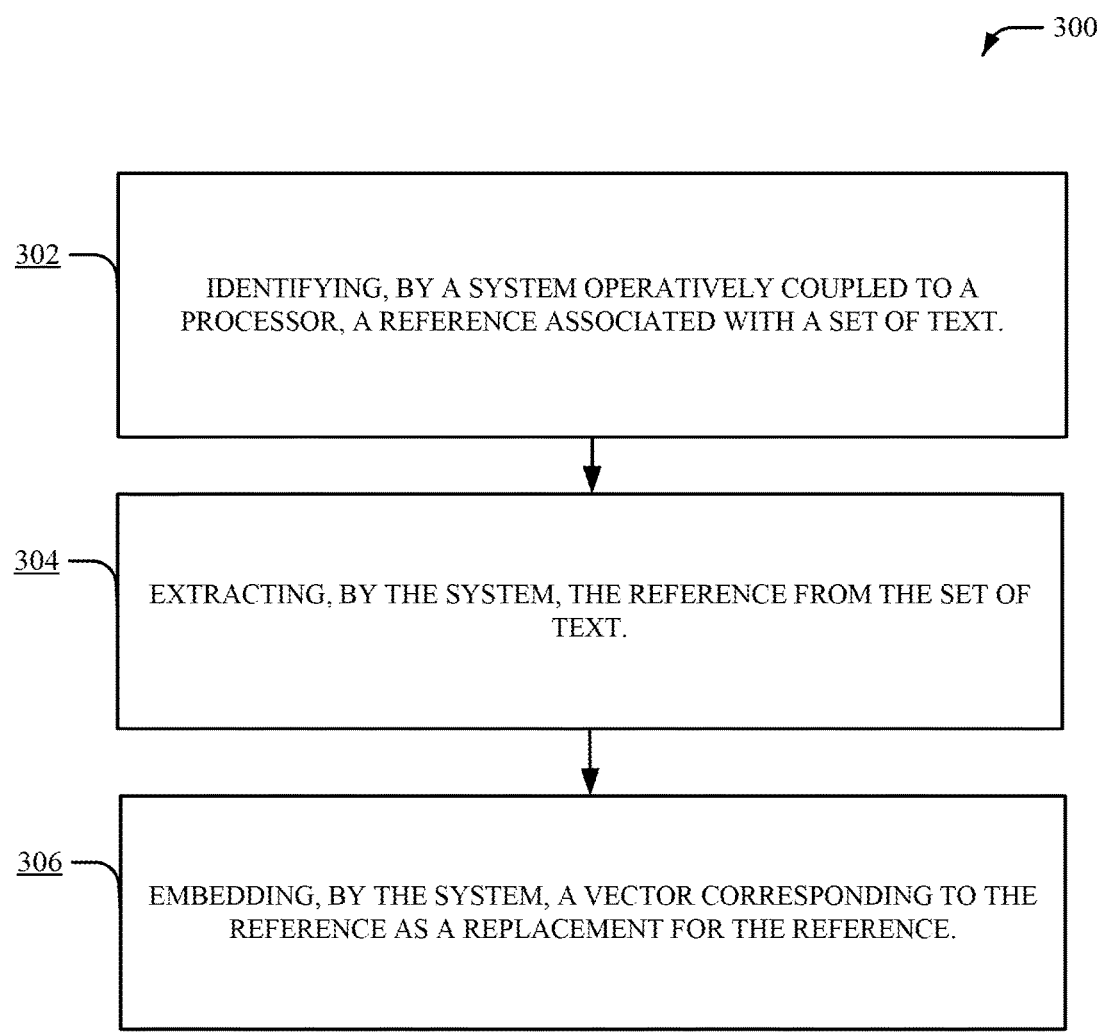
FIG. 3 illustrates a flow diagram of an example, non-limiting computer-implemented method that facilitates embedding a defined term within a textual reference in accordance with one or more embodiments described herein.

FIG. 3 illustrates a flow diagram of an example, non-limiting computer-implemented method 300 that facilitates embedding a defined term within a textual reference in accordance with one or more embodiments described herein. Repetitive description of like elements employed in other embodiments described herein is omitted for sake of brevity. In some implementations, at reference numeral 302, a system (e.g., system 100) operatively coupled to a processor (e.g., processor 112) can identify (e.g., using identification component 110) a reference associated with a set of text. In step 304, the system can extract (e.g., using extraction component 120) the reference from the set of text. In step 306, the system can embed (e.g., using embedding component 130) a vector corresponding to the reference as a replacement for the reference.

Figure 4:
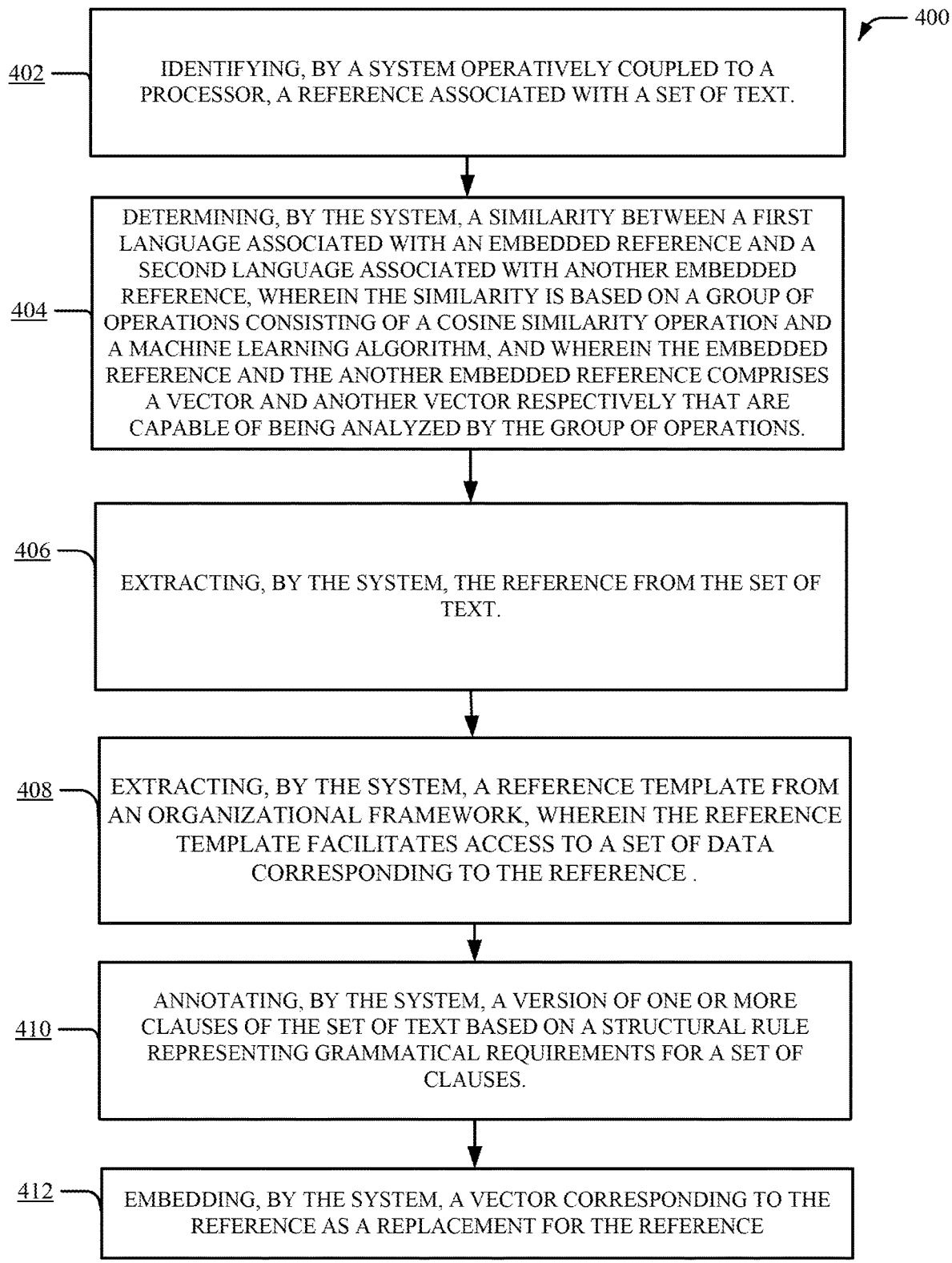
FIG. 4 illustrates a flow diagram of an example, non-limiting computer-implemented method that facilitates annotating a template version of textual references in accordance with one or more embodiments described herein.

FIG. 4 illustrates a flow diagram of an example, non-limiting computer-implemented method 400 that facilitates annotating a template version of textual references in accordance with one or more embodiments described herein. Repetitive description of like elements employed in other embodiments described herein is omitted for sake of brevity.

In step 402, a system (e.g., system 100) operatively coupled to a processor (e.g., processor 112) can identify (e.g., using identification component 110) a reference associated with a set of text. In step 404, the system can determine (e.g., using first determination component 210) a similarity between a first language associated with an embedded reference and a second language associated with another embedded reference, wherein the similarity is based on a group of operations consisting of a cosine similarity operation and a machine learning algorithm, and wherein the embedded reference and the another embedded reference comprises a vector and another vector respectively that are capable of being analyzed by the group of operations. In step 406, the system can extract (e.g., using extraction component 120) the reference from the set of text. In step 408, the system can extract (e.g., using template extraction component 510) a reference template from an organizational framework, wherein the reference template facilitates access to a set of data corresponding to the reference. In step 410, the system can annotate (e.g., using annotation component 810) a version of one or more clauses of the set of text based on a structural rule representing grammatical requirements for a set of clauses. In step 412, the system can embed (e.g., using embedding component 130) a vector corresponding to the reference as a replacement for the reference.

In another aspect, other non-limiting computer-implemented (not shown in the figures) methods that facilitate a determination of a similarity of textual content of a text comprising textual references in accordance with one or more embodiments are described herein. The other non-limiting method can include step 1 of a system (e.g., system 100) operatively coupled to a processor (e.g., processor 112) that can identify (e.g., using identification component 110), a common term corresponding to a set of reference terms within a set of text based on an ontological matching operation. At step 2, the system can extract (e.g., using extraction component 120) a reference term from the set of reference terms based on a similarity score representing an ontological similarity between the common term and the reference term. At step 3, the system can embed (e.g., using embedding component 130) the reference term and a corresponding vector within the set of text.

In another aspect, another non-limiting computer-implemented (not shown) can facilitate a determination of a similarity of textual content of a text comprising textual references in accordance with one or more embodiments are described herein. In this embodiment, the system (e.g., system 100) operatively coupled to a processor (e.g., processor 112) can identify (e.g., using identification component 110), a common term corresponding to a set of reference terms within a set of text based on an ontological matching operation. The system can determine (e.g., using first determination component 210) a similarity score between the common term and the reference term, wherein the similarity score is determined based on a group of operations consisting of a cosine similarity operation and a machine learning algorithm.

The system can extract (e.g., using extraction component 120) a reference term from the set of reference terms based on a similarity score representing an ontological similarity between the common term and the reference term. The system can also extract (e.g., using template extraction component 510) a template version of the set of text based on one or more clause rules, wherein the template version of the set of text represents the set of reference terms arranged into a clause organizational structure. Further, the system can annotate the template version of the set of text with clause annotations, wherein the template version of the set of text is annotated (e.g., using annotation component 810) based on a template matching operation performed on the template version of the set of text using the one or more clause rules. Additionally, the system can embed (e.g., using embedding component 130) the reference term and a corresponding vector within the set of text.

For simplicity of explanation, the computer-implemented methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art can understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because an embedding of reference text in a vector format is performed by components executed by a processor (e.g., processor 112) established from a combination of electrical and mechanical components and circuitry, a human is unable to replicate or perform the subject data packet configuration and/or the subject communication between processing components and/or a determination component. Furthermore, vectorized data associated with textual segments of reference text is accessed from a memory (e.g., using memory 108) where such access patterns a human are unable to replicate. Furthermore, the embedding of vectorized reference text is also an act that cannot be performed by a human. For example, a human is unable to integrate a reference text in a vector format into a document where the reference text can be compared to another segment of text in a vector format using cosine operations or machine learning operations. Furthermore, a human is unable to communicate similarity data and/or packetized data for communication between a main processor (e.g., using processor 118) and a memory (e.g., memory 108).

In order to provide a context for various aspects of the present invention, FIG. 1 as well as the following discussion is intended to provide a general description of an exemplary environment in which such various aspects of the present invention can be implemented.

Figure 5:
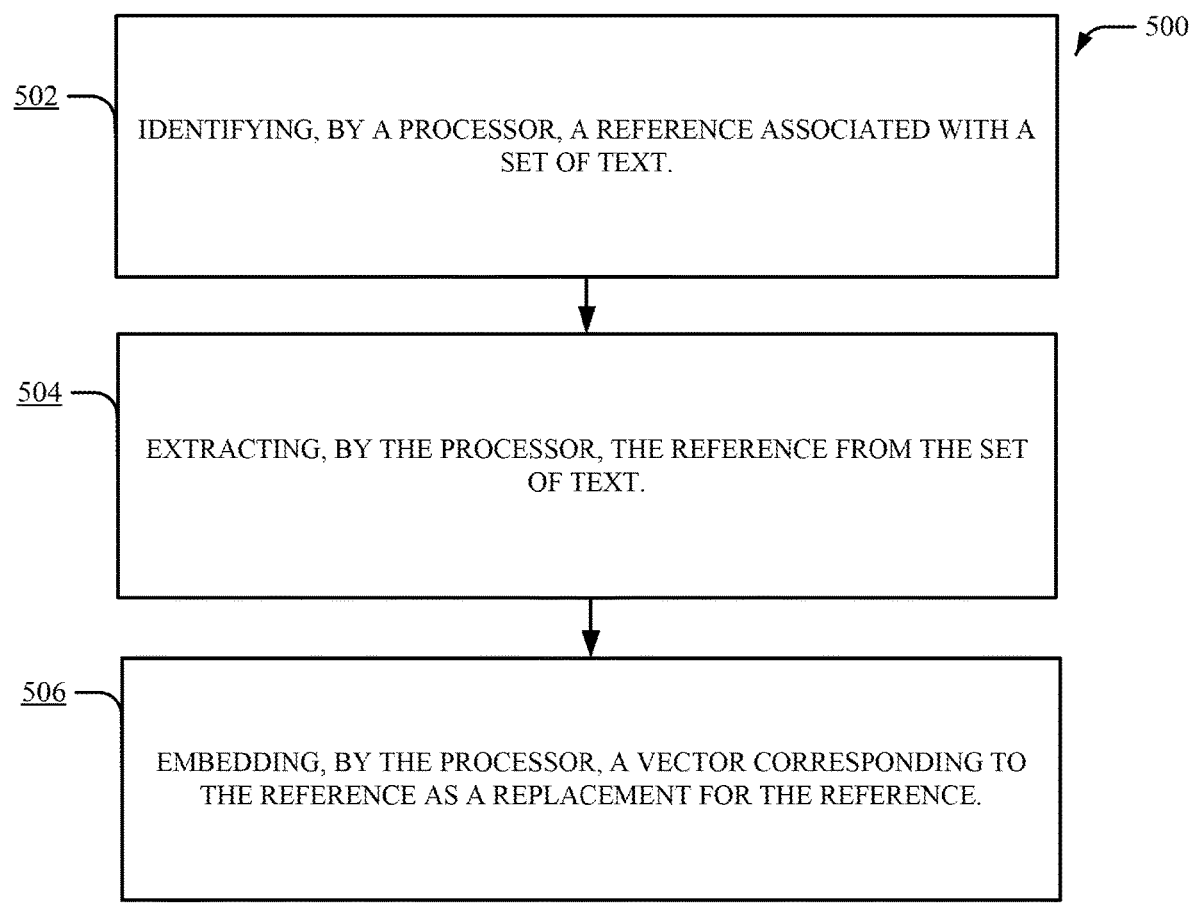
FIG. 5 illustrates a flow diagram of an example, non-limiting computer-program product that causes a processor to classify references terms into a sentence classification category in accordance with one or more embodiments described herein.

FIG. 5 illustrates a flow diagram of an example, non-limiting computer-program product 500 that causes a processor to classify references terms into a sentence classification category in accordance with one or more embodiments described herein. Repetitive description of like elements employed in other embodiments described herein is omitted for sake of brevity.

In step 502, the program instructions of a computer program product 500 cause the processor to identify a reference associated with a set of text. In step 504, the program instructions of a computer program product 500 cause the processor to extract the reference from the set of text. In step 506, the program instructions of a computer program product 500 cause the processor to embed a vector corresponding to the reference as a replacement for the reference.

Figure 6:
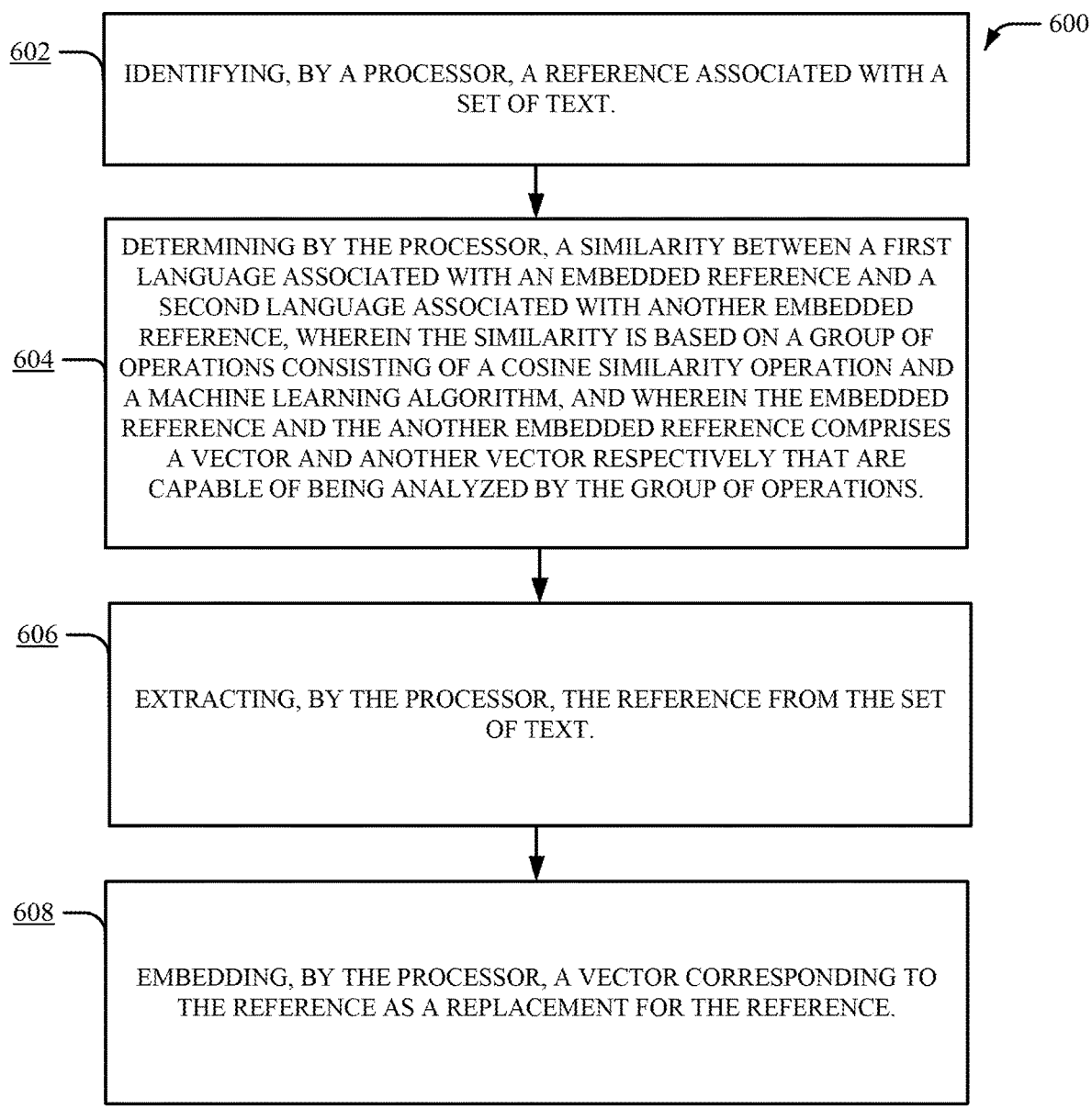
FIG. 6 illustrates a flow diagram of an example, non-limiting computer-program product that causes a processor to embed a vector within the set of text in accordance with one or more embodiments described herein.

FIG. 6 illustrates a flow diagram of an example, non-limiting computer-program product 600 that causes a processor to embed a vector within the set of text in accordance with one or more embodiments described herein. Repetitive description of like elements employed in other embodiments described herein is omitted for sake of brevity.

In step 602, the program instructions of a computer program product 500 cause the processor to identify a reference associated with a set of text. In step 604, the program instructions of a computer program product 600 cause the processor to determine a similarity between a first language associated with an embedded reference and a second language associated with another embedded reference, wherein the similarity is based on a group of operations consisting of a cosine similarity operation and a machine learning algorithm, and wherein the embedded reference and the another embedded reference comprises a vector and another vector respectively that are capable of being analyzed by the group of operations. In step 606, the program instructions of a computer program product 600 cause the processor to extract the reference from the set of text. In step 608, the program instructions of a computer program product 600 cause the processor to embed a vector corresponding to the reference as a replacement for the reference.

In another aspect, another non-limiting computer program product (not shown in the figures) comprising a computer readable storage medium having program instructions embodied therewith, the program instructions executable by a processor to cause the processor to facilitates a determination of a similarity of textual content of a text comprising textual references in accordance with one or more embodiments are described herein.

In step 1, the program instructions of a computer program product can cause the processor to classify a first reference term and a second reference term within a set of text into a sentence classification category based on one or more ontological language rules, wherein the one or more reference term comprise a defined reference term or an undefined reference term. In step 2, the program instructions of a computer program product can cause the processor to determine a first similarity score and a second similarity score, wherein the first similarity score is determined between a defined term of the set of text and the first reference term based on a first ontological similarity, and wherein the second similarity score is determined between the defined term and the second reference term based on a second ontological similarity. In step 3, the program instructions of a computer program product can cause the processor to extract the first reference term or the second reference term, wherein the first reference term is extracted based on whether the first similarity score is higher than the second similarity score, and wherein the second reference term is extracted based on whether the second similarity score is higher than the first similarity score.

In another aspect, another non-limiting computer program product (not shown in the figures) comprising a computer readable storage medium having program instructions embodied therewith, the program instructions executable by a processor to cause the processor to facilitates a determination of a similarity of textual content of a text comprising textual references in accordance with one or more embodiments are described herein.

In step 1, the program instructions of a computer program product can cause the processor to classify a first reference term and a second reference term within a set of text into a sentence classification category based on one or more ontological language rules, wherein the one or more reference term comprise a defined reference term or an undefined reference term. In step 2, the program instructions of a computer program product can cause the processor to determine a first similarity score and a second similarity score, wherein the first similarity score is determined between a defined term of the set of text and the first reference term based on a first ontological similarity, and wherein the second similarity score is determined between the defined term and the second reference term based on a second ontological similarity.

In step 3, the program instructions of a computer program product can cause the processor to extract the first reference term or the second reference term, wherein the first reference term is extracted based on whether the first similarity score is higher than the second similarity score, and wherein the second reference term is extracted based on whether the second similarity score is higher than the first similarity score. In step 4, the program instructions of a computer program product can cause the processor to embed an extracted first reference term comprising a first reference vector or an extracted second reference term comprising a second reference vector within the set of text based on whether the first similarity score is higher than the second similarity score or whether the second similarity score is higher than the first similarity score respectively.

Figure 7:
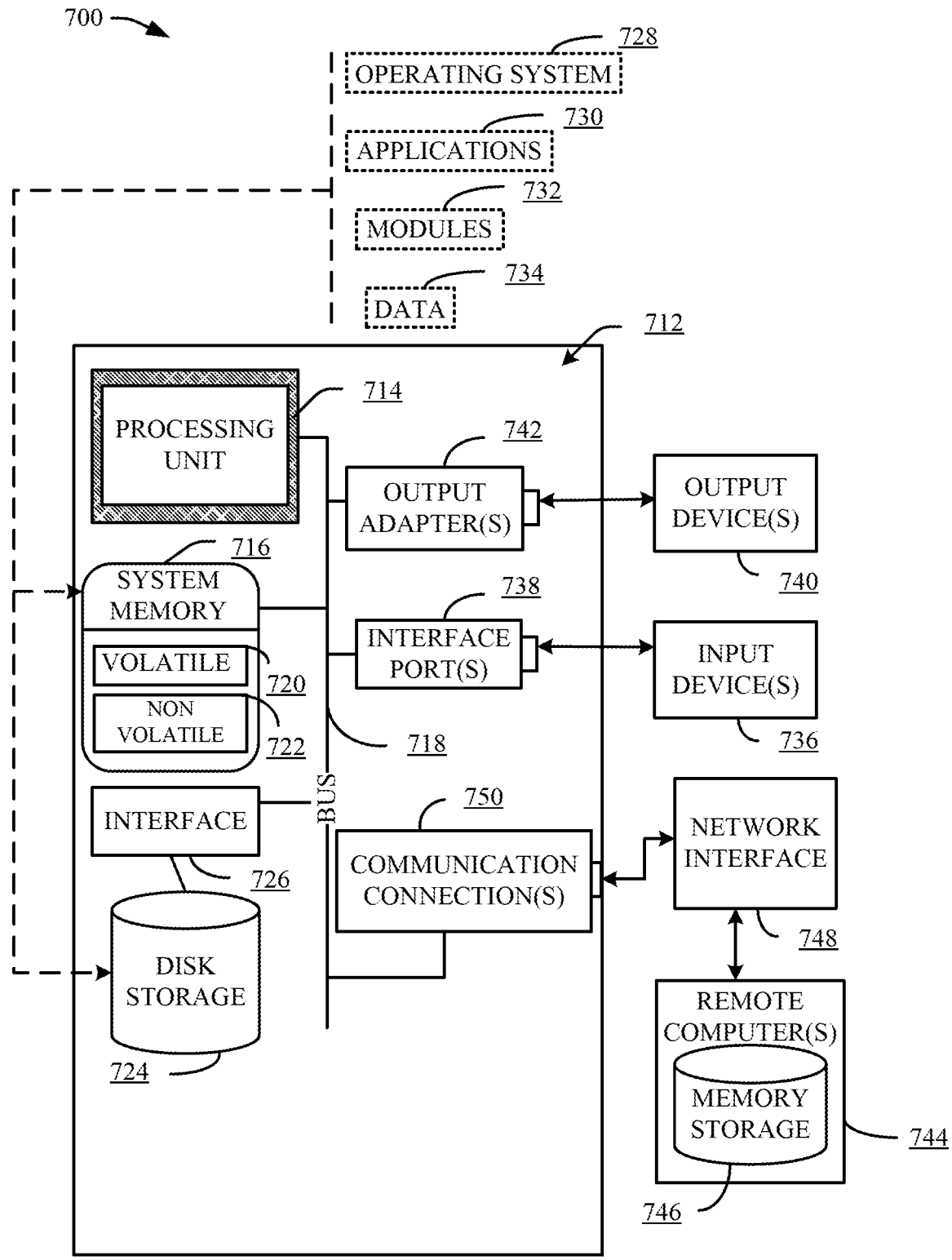
FIG. 7 illustrates a block diagram of an example, non-limiting system and network environment in which one or more embodiments described herein can be facilitated.

FIG. 7 illustrates a block diagram of an example, non-limiting system and network environment 700 in which one or more embodiments described herein can be facilitated. As depicted, environment 700 can include a computer 712. The computer 712 can also include a processing unit 714, a system memory 716, and a system bus 718. The system bus 718 couple's system components including, but not limited to, the system memory 716 to the processing unit 714. The processing unit 714 can be any of various available processors. Dual microprocessors and other multiprocessor architectures also can be employed as the processing unit 714. The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 716 can include volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 720 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 712 can also include removable/non-removable, volatile/non-volatile computer storage media. FIG. 7 illustrates, for example, a disk storage 724. Disk storage 724 can also include, but is not limited to, devices like a magnetic disk drive, floppy disk drive, tape drive, Jaz drive, Zip drive, LS-100 drive, flash memory card, or memory stick. The disk storage 724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 724 to the system bus 718, a removable or non-removable interface is typically used, such as interface 726. FIG. 7 also depicts software that acts as an intermediary between users and the basic computer resources described in the suitable operating environment 700. Such software can also include, for example, an operating system 728. Operating system 728, which can be stored on disk storage 724, acts to control and allocate resources of the computer 712.

System applications 730 take advantage of the management of resources by operating system 728 through program modules 732 and program data 734, e.g., stored either in system memory 716 or on disk storage 724. It is to be appreciated that this disclosure can be implemented with various operating systems or combinations of operating systems. A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port can be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a computer, a server, a router, a network PC, a workstation, a microprocessor based appliance, a peer device or other common network node and the like, and typically can also include many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 750 refers to the hardware/software employed to connect the network interface 748 to the system bus 718. While communication connection 750 is shown for illustrative clarity inside computer 712, it can also be external to computer 712. The hardware/software for connection to the network interface 748 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a memory that stores computer executable components;
    a processor that executes the computer executable components stored in the memory, wherein the computer executable components comprise:
        an identification component that:
            identifies a reference associated with a set of text; and
            determines a similarity between a first language associated with an embedded reference and a second language associated with another embedded reference, wherein the similarity is based on a group of operations comprising at least one of a cosine similarity operation or a machine learning algorithm, and wherein the embedded reference and the another embedded reference comprises a vector and another vector that are adapted to be analyzed by the group of operations;
        an extraction component that:
            extracts the reference from the set of text; and
            extracts a reference template from an organizational framework, wherein the reference template facilitates access to a set of data corresponding to the reference;
        an annotation component that annotates a version of one or more clauses of the set of text based on a structural rule representing grammatical requirements for a set of clauses;
        an embedding component that embeds the reference and corresponding mapping information at one or more locations within the set of text, wherein the corresponding mapping information is a set of numbers that are mapped to, and thereby represent, words of the reference text based on language characteristics, and wherein the embedding of the reference with the corresponding mapping information by the embedding component is employed using a neural sentence embedding model.

2. The system of claim 1, wherein the identification component comprises components from the group consisting of a hyperlink identification component that identifies whether the reference is linked by a hyperlink to the set of text and a contextualization component that identifies an organizational framework of the reference within the set of text.

3. The system of claim 1, further comprising a template matching component that matches the reference to a location within the reference template.

4. The system of claim 1, further comprising a rule matching component that organizes one or more clause within the set of text according to one or more clause rules.

5. The system of claim 1, wherein the extraction component employs a defined term extraction component that extracts a defined term from the set of text, wherein an extraction of the defined term is based on performance of a semantic parsing operation on the set of text.

6. The system of claim 5, further comprising an ontological matching component that ontologically matches the defined term to a reference term within the set of text.

7. The system of claim 6, further comprising a second determination component that determines a similarity score based on a comparison of the defined term and the reference term, wherein the similarity score represents a degree of similarity between the defined term and the reference term.

8. A computer-implemented method, comprising:
    identifying, by a system operatively coupled to a processor, a reference associated with a set of text;
    extracting, by the system, the reference from the set of text;
    determining, by the system, a similarity between a first language associated with an embedded reference and a second language associated with another embedded reference, wherein the similarity is based on a group of operations comprising at least one of a cosine similarity operation or a machine learning algorithm, and wherein the embedded reference and the another embedded reference comprises a vector and another vector that are adapted to be analyzed by the group of operations;
    extracting, by the system, the reference from the set of text;
    extracting, by the system, a reference template from an organizational framework, wherein the reference template facilitates access to a set of data corresponding to the reference;
    annotating, by the system, a version of one or more clauses of the set of text based on a structural rule representing grammatical requirements for a set of clauses;
    embedding, by the system, employing a neural sentence embedding model, mapping information corresponding to the reference, wherein the mapping information is based on a relationship between a key term and the reference, and wherein the mapping information and the reference are embedded at one or more locations within the set of text, wherein the mapping information is a set of numbers that are mapped to, and thereby represent, words of the reference text based on language characteristics.

9. The computer-implemented method of claim 8, wherein an extraction of the reference is based on performance of a semantic parsing operation on the set of text.

10. A computer program product for efficiently determining textual similarities, the computer program product comprising a computer readable storage medium having program instructions embodied therewith, the program instructions executable by a processor to cause the processor to:
 identify a reference associated with a set of text;
 determine a similarity between a first language associated with an embedded reference and a second language associated with another embedded reference, wherein the similarity is based on a group of operations comprising at least one of a cosine similarity operation or a machine learning algorithm, and wherein the embedded reference and the another embedded reference comprises a vector and another vector that are adapted to be analyzed by the group of operations;
 extract the reference from the set of text;
 extract a reference template from an organizational framework, wherein the reference template facilitates access to a set of data corresponding to the reference;
 annotate a version of one or more clauses of the set of text based on a structural rule representing grammatical requirements for a set of clauses; and
 embed mapping information with the reference at one or more locations within the set of text, wherein the mapping information is a set of numbers that are mapped to, and thereby represent, words of the reference based on language characteristics, and wherein the embedding of the reference with the mapping information is employed using a neural sentence embedding model.

11. The computer program product of claim 10, wherein the vector is disposed to be mapped to similar words based on language characteristics comprising contextual descriptions and semantic meanings.

\* \* \* \* \*